May 31, 1949.  A. F. GARDNER  2,471,679
OIL SEAL
Filed May 14, 1945
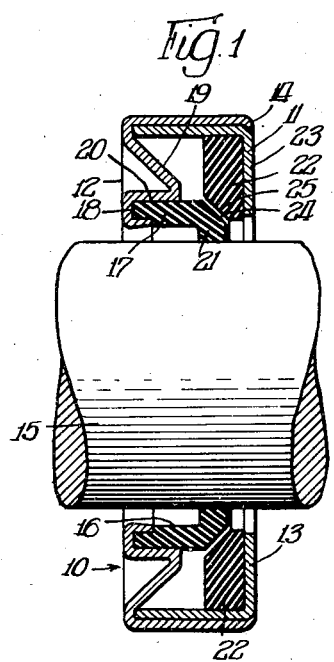
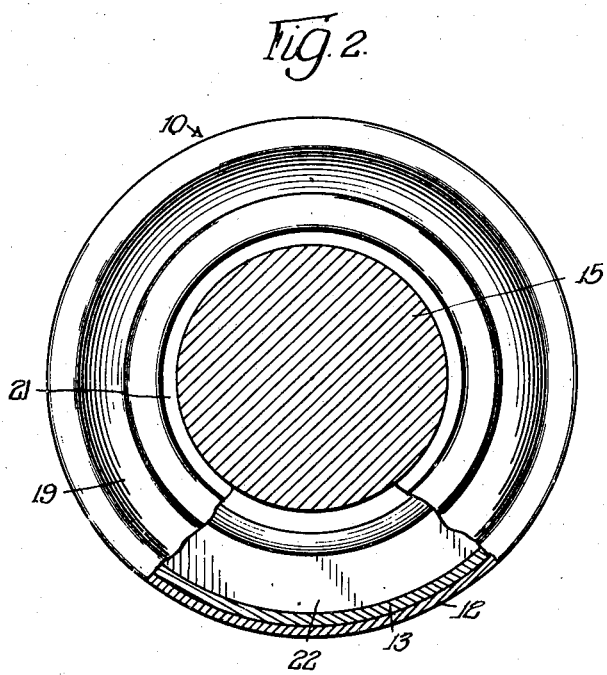
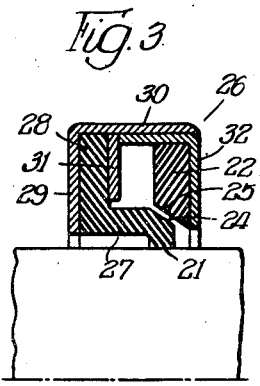
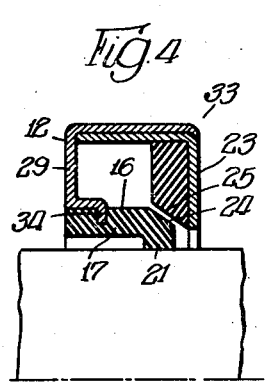
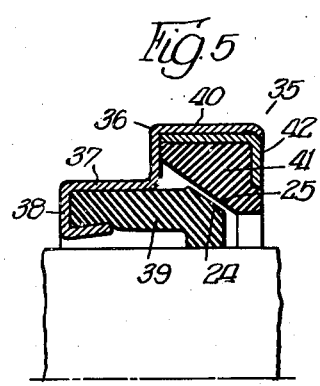
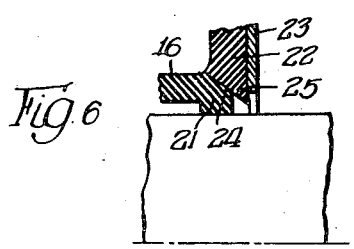
INVENTOR.
Allen F. Gardner,
BY
Cromwell, Greist & Warden
Attys Patented May 31, 1949

2,471,679

UNITED STATES PATENT OFFICE 2,471,679

OIL SEAL

Allen F. Gardner, Birmingham, Mich., assignor to Chicago Rawhide Manufacturing Company, Chicago, Ill., a corporation of Illinois Application May 14, 1945, Serial No. 593,701

4 Claims. (Cl. 288—3)

This invention pertains to an improved oil seal adapted for use between relatively rotatable members to prevent leakage therebetween.

It is an object of the invention to provide a seal of the type described including component parts which are self-actuating in use to set up and maintain an efficient sealing relationship with reference to the relatively rotating members.

It is a further object to provide a simple, compact and inexpensive seal of the type described, including a yieldable sealing member and coacting resilient thrust member which are fabricated of a material susceptible in its intended use to establish and maintain a desired sealing relationship of the former to a rotating part.

Other more specific objects and advantages of the invention will be apparent to those skilled in the art upon a full understanding of the improved structure herein described.

In the drawings,

Fig. 1 is a fragmentary view in longitudinal vertical section illustrating structural details of one embodiment of the seal of the invention;

Fig. 2 is a face view of the seal, as viewed from the left of Fig. 1, partially broken away and in transverse vertical section to further illustrate structural features;

Figs. 3, 4 and 5 are similar fragmentary views in longitudinal vertical section illustrating further modified embodiments of a seal construction incorporating the invention; and Fig. 6 is a fragmentary view in section similar to Figs. 1, 3, 4 and 5, illustrating the functioning relationship of certain of the parts of the seal following use in the intended manner.

Referring to the drawings, the reference numeral 10 in Figs. 1 and 2 generally designates one embodiment of an improved oil seal in accordance with this invention. This seal comprises a casing 11 adapted to be secured in fixed relation to a member such as a casing pump housing or like liquid handling housing, as by a force fit, said casing comprising an outer annular cup member 12 and an inner annular cup-like clamping ring 13 which telescopes within member 12 in the manner illustrated and is held in place by spinning or upsetting the peripheral edge 14 of the outer member, as shown. The members 12, 13 are centrally apertured for the reception of a rotatable shaft 15 with substantial radial clearance.

The reference numeral 16 designates an annular packing ring of generally L-shaped section. This packing ring 16 is fabricated of a rubber-like material not subject to deterioration in oil or other hydrocarbon or like liquids, but which is possessed of a definite susceptibility to swelling in section or "growing" in the presence of these fluids. Certain synthetic rubber materials, such as the chloroprene polymers designated by the term "neoprene" and various other synthetic rubber packing compositions designated generally by the term "Sirvene," a trade-mark of the Chicago Rawhide Manufacturing Company, of Chicago, Illinois, and the like, are well suited for this purpose. Ring 16 has an axially extending sleeve portion 17 paralleling but radially spaced from shaft 15, which is fixedly clamped in an annular groove 18 in a re-entrant radial flange 19 of member 12. This re-entrant flange is shaped to provide an internal annular ledge 20 of substantial axial length which radially braces and sustains the packing ring sleeve portion 17 from the exterior thereof.

The packing ring 16 is also provided with a radially inturned annular lip 21 adapted for sealing engagement with rotating shaft 15 and initially engaging said shaft under the inherent resiliency of the member 16.

The reference numeral 22 designates an annular spring thrust ring which is secured to a radial flange 23 of cup-like clamping ring 13, as by bonding in a known manner. Ring 22 is preferably fabricated of the same material as packing ring 16. As illustrated, the packing ring 16, radially outwardly of its shaft engaging lip 21, is provided with an inclined surface 24; and the spring thrust ring 22 carries a similarly inclined surface 25. These inclined surfaces 24, 25 are preferably, in the initial condition of the seal, spaced from one another somewhat. As an illustrative example, a spacing of one sixty-fourths of an inch has been employed with satisfactory results in a seal of about 1.69 inch outer diameter. However, this clearance is susceptible of variation and may even be entirely eliminated, with surfaces 24, 25 in direct apposition, so long as thrust ring 22 does not exert appreciable and undue radial pressure on the packing ring 16 in the initially assembled condition relative to the shaft. It is contemplated that the application of substantial radial thrust shall arise following an initial period of operation of the seal.

Due to the characteristics of the rubber-like material of the rings 16, 22, exposure thereof in use to oil or other hydrocarbon liquids or liquids capable of producing the swelling referred to above, results in "growing" of the respective rings and consequent approach and compression of the surfaces 24, 25 in meeting engagement with one another, which is in turn followed by the transmission of radial thrust from the ring 22 to the packing ring 16. Hence, the resilient annular sealing lip 21 is effectively urged against the shaft or like surface to be sealed, in the same manner as if a metallic spring were employed. This radial thrust is preserved throughout the life of the seal, regardless of wearing of the annular sealing lip 21 in use.

The structure is exceedingly simple and inexpensive both in the character of its components and in the assembly thereof.

In Fig. 3 I illustrate a modified embodiment of the foregoing features in a seal generally designated 26. In this construction the packing ring 27 carries a radially outwardly projecting annular flange 28 which is clamped between the radial side flange 29 of the outer casing member 30 and an inner retaining washer 31, the latter being held in place by cup-like clamping ring 32. In other respects the construction is similar to that of Fig. 1 and functions in the same manner upon self-actuation of the material of the packing and radial thrust rings 22, 27, i. e., following exposure to a liquid capable of producing the aforesaid swelling or "growing" action.

In Fig. 4, the construction of a further modified seal 33 is likewise similar to Fig. 1, except that the axially extending sleeve portion 17 of packing ring 16 is held in fixed position relative to the outer casing member 12 by means of radially directed annular lip 34 on the radial flange 29 of the cup-like casing member 12, or by a plurality of circumferentially spaced lugs, said lip or lugs being embedded in the material of the packing ring sleeve portion 17.

In Fig. 5, the modified seal, generally designated 35, has an outer casing member 36 which is radially stepped on its periphery to provide an inner gripping element 37, in an annular groove 38 of which the packing ring sleeve 39 is gripped and held in place, and a radially enlarged portion 40. In this enlarged portion a thrust ring 41 of the rubber-like radial thrust material, in a generally triangular cross section, is held by the cup-like clamping ring 42, said clamping ring being disposed in an annular rabbet of said resilient ring 41. The packing and thrust rings 39, 41 have inclined coacting surfaces 24, 25, as in the preceding embodiments and the functioning thereof is the same as previously described.

In any of the above embodiments a very effective liquid-tight engagement of the packing ring with a surface to be sealed is had, which is automatically increased in effectiveness and rendered self-compensating for wear as the seal is operated in use. All of the embodiments are very simple and inexpensive, as pointed out.

What I claim is:

1. A seal adapted for coaction with a pair of relatively movable parts comprising a flexible sealing member adapted to be secured to one of said parts and having an annular sealing portion radially engageable with the other, an annular thrust member disposed concentrically of said sealing member, said members having adjacent, annular, generally frusto-conical surfaces engageable in the operation of the seal and at least one thereof being fabricated of a resilient material susceptible of swelling in section when subjected to certain fluids in operation to impart radial sealing thrust through said surfaces, and means supporting said members in operative relation including means rigidly confining said last named one of said members axially at a zone thereof adjacent and axially aligned with its frusto-conical surface, to thereby restrain swelling thereof in a direction laterally of the thrust direction.

2. A seal for a pair of relatively movable parts, comprising an annular casing adapted to be secured to one of said parts, a flexible packing ring secured to said casing and having an annular radially acting sealing portion engageable with another of said relatively movable parts, and an annular thrust ring mounted concentrically of said sealing ring in said casing, said rings having adjacent, annular meeting surfaces, and at least one thereof being fabricated of a resilient material susceptible of swelling in section and radially compressing the other ring when subjected to certain fluids in operation, said casing including means directly engaging and confining said one of said rings axially at a zone thereof adjacent and axially aligned with its annular meeting surface, to thereby restrain swelling thereof in a direction other than the radial direction.

3. A seal for a pair of relative movable parts, comprising an annular casing adapted to be secured to one of said parts, a flexible packing ring secured to said casing and having an annular radially acting sealing portion engageable with another of said relatively movable parts, and an annular thrust ring mounted concentrically of said sealing ring in said casing, said rings having adjacent, annular, generally frusto-conical meeting surfaces, and at least one thereof being fabricated of a resilient material susceptible of swelling in section and radially compressing said surface of the other ring when subjected to certain fluids in operation, said casing including means confining said one of said rings axially at a zone thereof adjacent and axially aligned with its frusto-conical surface, to thereby restrain swelling thereof in a direction other than the radial direction.

4. A seal for a pair of relative movable parts, comprising an annular casing adapted to be secured to one of said parts, a flexible packing ring secured to said casing and having an annular radially acting sealing portion engageable with another of said relatively movable parts, and an annular thrust ring mounted concentrically of said sealing ring in said casing, said rings having adjacent, annular, generally frusto-conical meeting surfaces which are spaced somewhat from one another in initial condition, and at least one thereof being fabricated of a resilient material susceptible of swelling in section and radially compressing said surface of the other ring when subjected to certain fluids in operation, said casing including means confining said one of said rings axially at a zone thereof adjacent and axially aligned with its frusto-conical surface, to thereby restrain swelling thereof in a direction other than the radial direction.

ALLEN F. GARDNER.

REFERENCES CITED

The following references are of record in the file of this patent:

UNITED STATES PATENTS

| Number | Name | Date |
|---|---|---|
| 1,995,813 | Olson | Mar. 26, 1935 |
| 2,089,461 | Winter | Aug. 10, 1937 |
| 2,316,941 | Dodge | Apr. 20, 1943 |
| 2,345,588 | Dodge | Apr. 4, 1944 |
| 2,397,847 | Dodge | Apr. 2, 1946 |